(No Model.)

L. BOUDREAU.
VELOCIPEDE.

No. 463,825. Patented Nov. 24, 1891.

Witnesses:
Chas. B. Shumway
Edward H. Rogers

Inventor
Leon Boudreau
By Geo. D. Seymour
Atty.

THE NORRIS PETERS CO., PHOTO-LITHO., WASHINGTON, D. C.

UNITED STATES PATENT OFFICE.

LEON BOUDREAU, OF BOSTON, MASSACHUSETTS, ASSIGNOR TO THE OVERMAN WHEEL COMPANY, OF SAME PLACE.

VELOCIPEDE.

SPECIFICATION forming part of Letters Patent No. 463,825, dated November 24, 1891.

Application filed October 13, 1887. Serial No. 252,232. (No model.)

*To all whom it may concern:*

Be it known that I, LEON BOUDREAU, residing at Boston, in the county of Suffolk and State of Massachusetts, have invented certain new and useful Improvements in Velocipedes; and I do declare the following to be a full, clear, and exact description of the same, reference being had to the accompanying drawings, which form a part of this specification.

My invention relates to an improvement in velocipedes, the object being to provide them with spring-forks and stays absorbing vertical vibration and securing lateral rigidity.

With these ends in view my invention consists in the combination, with a bowed spring-fork, of a stay therefor and a movable hinge connection for one end of the stay to accommodate the action between the ends of the fork.

My invention further consists in certain details of construction and combinations of parts, as will be hereinafter described, and pointed out in the claims.

Figure 1:
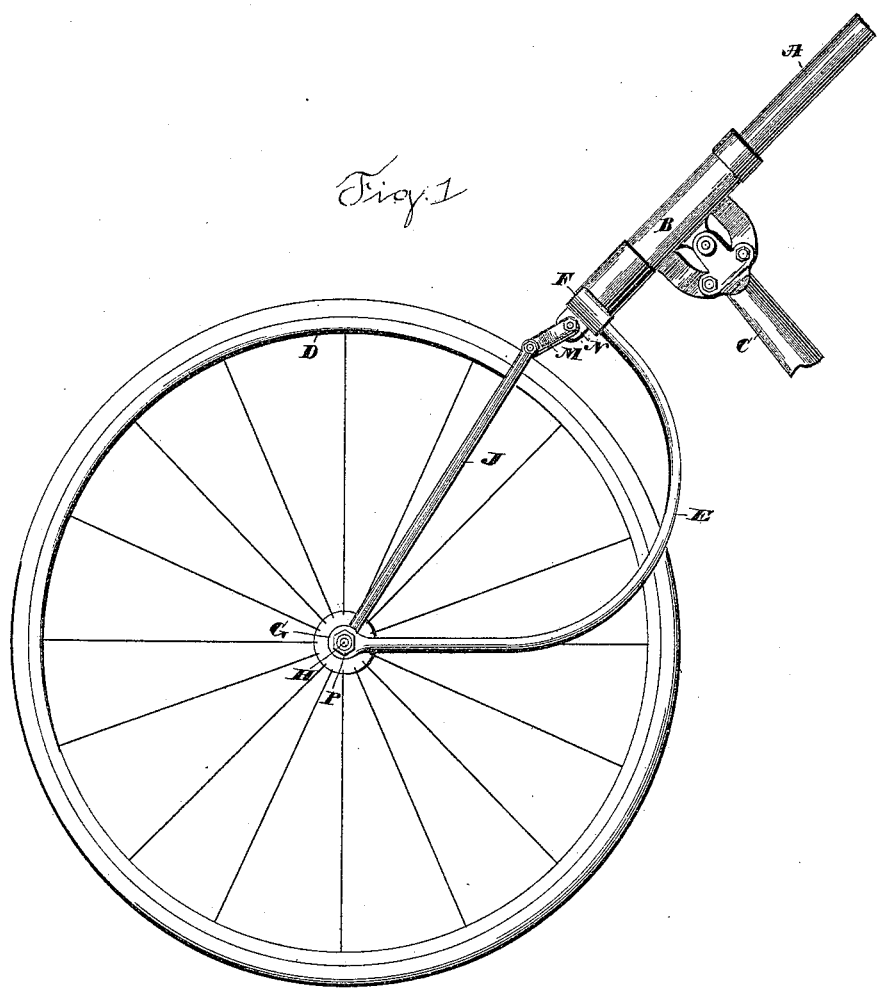
Figure 2:
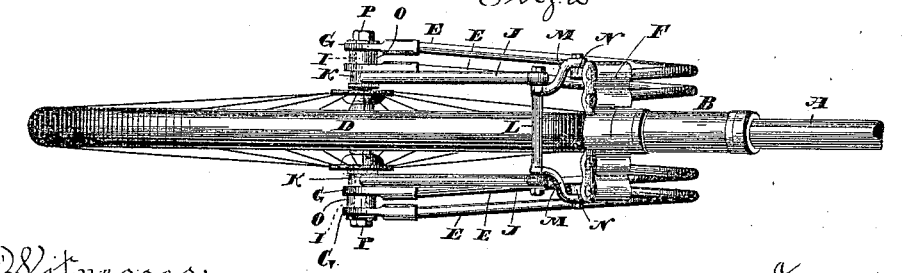

In the accompanying drawings, Figure 1 is a view in side elevation of my improved hinged connection between a spring-fork and a stay, and Fig. 2 is a plan view thereof.

As herein shown, the spring, stay, and hinge are applied to a bicycle-steering tricycle having a steering-rod A, steering-head B, frame C, and wheel D of ordinary construction. A bowed spring-fork, consisting of four heavy bowed rods E E E E, carries the wheel D and connects it with the vehicle. The upper ends of such rods are rigidly attached in pairs to the opposite ends of a cross-head F, made integral with or secured to the lower end of the steering-rod, while their lower ends are provided with eyes G, adapting them to be slipped over the extended ends K of the axle I of the said wheel. The respective rods are placed side by side in the same lateral plane, and those on opposite sides of the wheel are nearly parallel. There is, however, a gradual divergence in the rods from their upper to their lower ends, so that the fork, as a structure, is tapering and widens from the point of its attachment to the steering-rod to its connection with the axle. The rods are bowed to bring the steering-head in line with the axle, and so that beginning at their upper ends they will follow the rim of the wheel, and then bending extend forward on a horizontal line, passing through the axle of the same.

The stay consists, as herein shown, of two arms J, provided at their lower ends with eyes K K, adapting them for connection with the extended ends of the axle.

A horizontal coupler L, located above and extending transversely across the rim of the wheel and parallel with the axle thereof, is pivotally connected at its opposite ends with the upper ends of the said arms J J, the coupler being itself provided with two curved arms M M, pivoted at their outer ends to lugs N N, depending from the opposite ends of the cross-head F aforesaid. The said coupler and arms therefore form a vertically-movable hinge connection between the stay-arms and the frame of the vehicle and accommodate the stay-arms to the action between the ends of the fork without impairing their value as braces against lateral deflection. Washers O, located upon the ends H of the axle, are interposed between the eyes of the spring-rods and stay-arms and preserve the relations of the same, the eyes and washers being tied together by nuts P, screwed onto the said ends of the axle. The spring-rods of the fork being placed side by side brace each other against twisting or other deflection or distortion resulting from lateral strain, so that the wheel will be responsive in steering and free from wearing in running. At the same time the fork responds readily to vertical impressions, cushioning easily, absorbing vibration, and greatly promoting the comfort of the rider and saving the machine much wrenching and strain, and thereby increasing its durability. The stay stiffens the spring-fork against lateral deflection and torsional strain. The hinge-coupling between the stay and the frame accommodates vertical action between the ends of the fork without impairing the value of the stay-arms as lateral braces, as before referred to.

Although, as herein shown, the invention is applied to bicycle-steering tricycles, it is not limited to such use, but may be utilized in bicycles of the safety type, and in fact in all cycle constructions where available. I would therefore have it understood that I do not limit myself to the exact construction shown and described, but hold myself at liberty to make such changes and alterations as fairly fall within the spirit and scope of my invention.

I do not broadly claim the combination, with a spring-fork, of a stay having one of its ends pivoted to accommodate vertical movement in the fork, that being the invention of Mr. Albert H. Overman and claimed in an application pending herewith.

Having fully described my invention, what I claim as new, and desire to secure by Letters Patent, is—

1. In a velocipede, the combination, with a bowed spring-fork and a stay, of a movable hinge connection for one end of the stay to accommodate the vertical cushioning between the ends of the fork, substantially as set forth.

2. In a velocipede, the combination, with a bowed spring-fork and a stay, of a vertically-movable hinge connection for the upper end of the stay to accommodate the vertical cushioning between the ends of the fork, substantially as set forth.

3. In a velocipede, the combination, with a bowed spring-fork and a stay, of a vertical hinge connection for one end of the stay and including a horizontal coupler, substantially as set forth.

4. In a velocipede, the combination, with a bowed spring-fork, of a stay consisting of two arms respectively located on opposite sides of the wheel, a horizontal vertically-movable coupler connecting the upper ends of the stay-arms above the wheel, and pivotal connection between the coupler and the vehicle, permitting a vertical movement of the former, substantially as set forth.

5. In a velocipede, the combination, with a bowed spring-fork, of a stay consisting of two arms respectively located on opposite sides of the wheel, and a coupler connecting the stay-arms at a point above the wheel and provided with arms connecting the coupling with the vehicle, substantially as set forth.

6. In a velocipede, the combination, with a spring-fork, of a radial stay therefor, having a suspended vertically-movable hinge connection with the vehicle-frame, substantially as set forth.

In testimony whereof I have signed this specification in the presence of two subscribing witnesses.

LEON BOUDREAU.

Witnesses:
A. C. BENTON,
W. C. OVERMAN.